(12) United States Patent
Mizrahi

(10) Patent No.: US 9,863,580 B2
(45) Date of Patent: Jan. 9, 2018

(54) SYSTEM AND APPARATUS FOR HANGING HEAVY OBJECTS

(71) Applicant: Eliahu Mizrahi, Freehold, NJ (US)

(72) Inventor: Eliahu Mizrahi, Freehold, NJ (US)

( * ) Notice: Subject to any disclaimer, the term of this patent is extended or adjusted under 35 U.S.C. 154(b) by 27 days.

(21) Appl. No.: 14/803,835

(22) Filed: Jul. 20, 2015

(65) Prior Publication Data
US 2016/0178120 A1 Jun. 23, 2016

Related U.S. Application Data

(60) Provisional application No. 62/026,925, filed on Jul. 21, 2014, provisional application No. 62/173,164, filed on Jun. 9, 2015.

(51) Int. Cl.
| | |
|---|---|
| *A47H 1/10* | (2006.01) |
| *F16M 13/02* | (2006.01) |
| *F24F 13/32* | (2006.01) |

(52) U.S. Cl.
CPC .......... *F16M 13/027* (2013.01); *F24F 13/32* (2013.01)

(58) Field of Classification Search
CPC ...... F16M 13/027; H02G 3/125; H02G 3/381; H02G 3/263; H02G 3/08; H05K 5/0204

USPC ............. 248/343, 327, 317; 174/58, 57, 60; 220/3.9
See application file for complete search history.

(56) References Cited

U.S. PATENT DOCUMENTS

| | | | | |
|---|---|---|---|---|
| 5,667,181 | A * | 9/1997 | van Leeuwen | E04B 9/18 248/343 |
| 6,345,800 | B1 * | 2/2002 | Herst | E04B 9/006 248/342 |
| 8,054,649 | B2 * | 11/2011 | Peng | H05K 7/1487 248/298.1 |
| 8,087,631 | B1 * | 1/2012 | Gretz | E04B 9/006 220/3.9 |
| 8,276,860 | B2 * | 10/2012 | Ye | G06F 1/20 248/200 |
| 8,297,579 | B1 * | 10/2012 | Gretz | H02G 3/125 220/3.9 |
| 9,261,120 | B2 * | 2/2016 | Colangelo | F16B 2/22 |

* cited by examiner

*Primary Examiner* — Todd M Epps
(74) *Attorney, Agent, or Firm* — Meagher Emanuel Laks Goldberg & Liao, LLP

(57) ABSTRACT

Systems, methods, architectures, mechanisms or apparatus adapted to suspend or otherwise hang heavy objects such as chandeliers such as from a ceiling via a junction box suspended therein from a crossbar secured to one or more adjoining beams or joists via respective bracket housings configured to adjust an inclination of the crossbar secured therein.

19 Claims, 9 Drawing Sheets

SYSTEM AND APPARATUS FOR HANGING HEAVY OBJECTS

CROSS-REFERENCE TO RELATED APPLICATION

This application claims the benefit of provisional patent application Ser. Nos. 62/026,925, filed on Jul. 21, 2014 and 62/173,164, filed on Jun. 9, 2015, both entitled SYSTEM AND APPARATUS FOR HANGING HEAVY OBJECTS FROM CEILINGS, which provisional patent applications are incorporated herein by reference in their entireties.

FIELD OF THE INVENTION

The invention relates generally to systems and apparatus for hanging heavy objects such as chandeliers from ceilings.

BACKGROUND

Existing systems for hanging heavy objects from ceilings are cumbersome and extremely expensive. The systems are adapted to secure a standard electrical box such as a 4"×4"× 1.5" junction box to some mechanism adapted to attach to ceiling beams, joists or other structural members of a house or building. For example, a typical installation comprises securing the junction box directly to a structural member or securing the junction box to a cross piece secured between two structural members. Such installations work best within the context of new construction where all beams, joists and other structural members of the house or building are specifically located in appropriate positions to facilitate installation of the logical box.

Unfortunately, when retrofitting a house or building to include a heavy hanging object such as a chandelier, ceiling fan and the like, the location and construction techniques associated with beams, joists and/or other structural members within the ceiling are usually not known. In these cases, costs are increased due to the time necessary for custom installation work and/or the use of custom installation components.

SUMMARY

Various deficiencies in the prior art are addressed by systems, methods, architectures, mechanisms or apparatus adapted to suspend or otherwise hang heavy objects such as chandeliers such as from a ceiling via a junction box suspended therein from a crossbar secured to one or more adjoining beams or joists via respective bracket housings configured to adjust an inclination of the crossbar secured therein.

An apparatus according to one embodiments is adapted for hanging a load from structural members within a ceiling, the apparatus comprising a junction box configured for securing thereto a load; a crossbar configured to cooperate with the junction box to support thereby the junction box; and a first bracket housing configured to cooperate with the crossbar and a first structural member within the ceiling, the first bracket housing comprising at least one aperture for receiving an end of the crossbar at one of a plurality of vertical positions.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Embodiments of the invention will be primarily described within the context of a system adapted to suspend or otherwise hang heavy objects such as chandeliers from a ceiling via a junction box suspended therein from a crossbar secured to adjoining beams or joists via respective bracket housings. Those skilled in the art will readily adapt the various embodiments to construction techniques other than beams, joists and the like commonly used within the context of residential construction.

Figure 1:
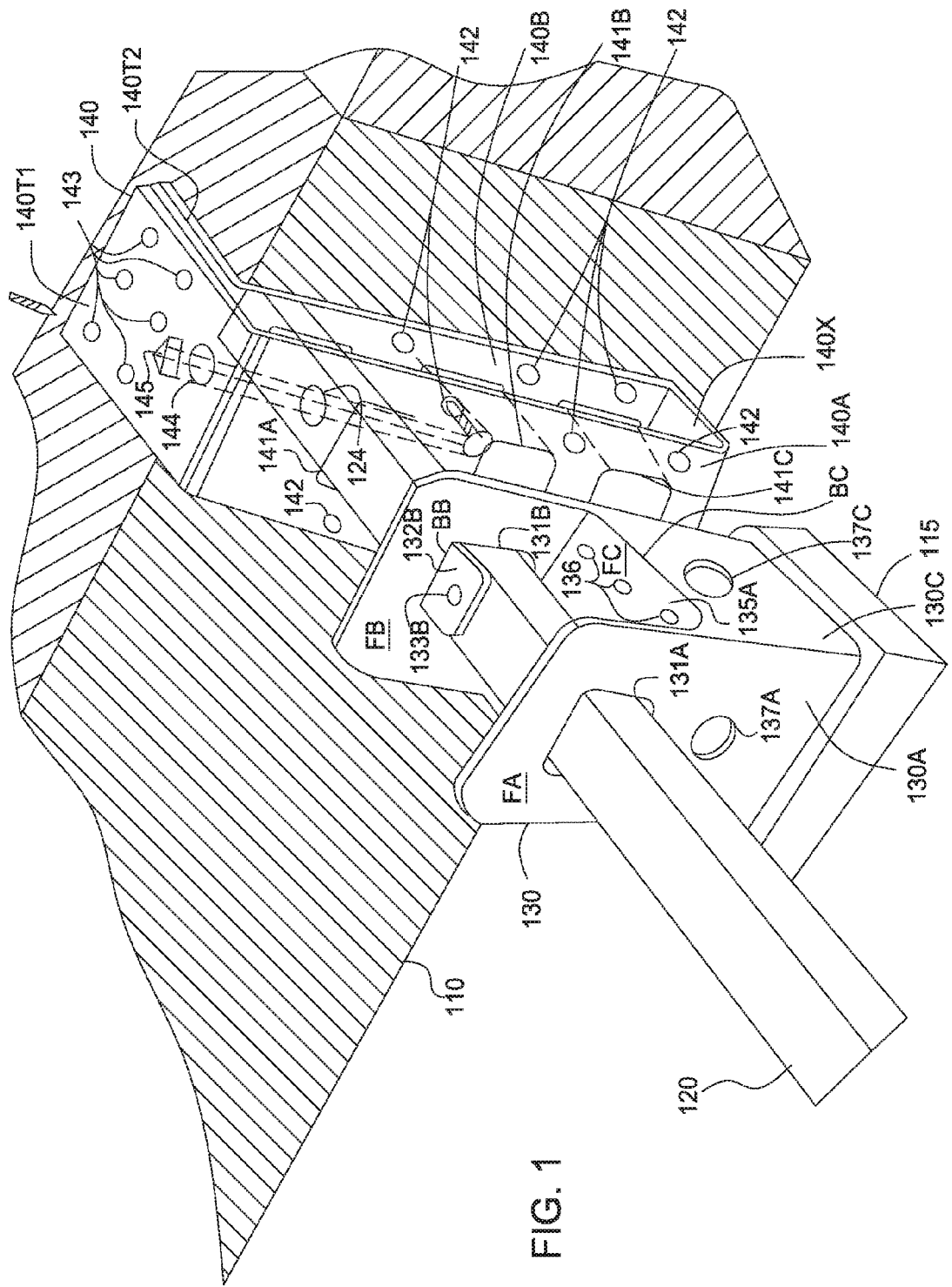
FIG. 1 depicts a system according to one embodiment.

FIG. 1 depicts a system according to one embodiment. Specifically, FIG. 1 depicts an embodiment adapted for hanging heavy objects from a ceiling constructed using a plurality of beams, such as wood beams, metal beams and the like. Generally speaking, the object to be secured is attached to a junction box having apertures sized to accept a crossbar disposed between two parallel beams. The crossbar is attached to each beam via a bracket housing.

Of particular interest is the construction of the junction box and bracket housing. Each of these elements may be formed using a single sheet of metal which may be subjected to various drilling, punching, partial punching, bending and other operations to efficiently form thereby the desired element.

Referring to FIG. 1, a crossbar 120 is disposed between a pair of parallel beams 110 (only one of the beams 110 is shown). The crossbar 120 is attached to each beam 110 via a bracket housing 140. Suspended from the crossbar 120 is a junction box 130. Secured to a bottom portion of the junction box 130 is a load 115, such as presented by a chandelier or other heavy object.

The junction box 130 comprises a single piece of sheet metal which has been cut, punched, folded, bent, drilled or otherwise processed to form the exemplary junction box 130 described herein. In various embodiments, other shapes, sizes and so on may be used depending upon the size/shape of the crossbar 120, the size/weight of the object to be suspended and so on.

The depicted junction box 130 comprises a substantially rectilinear box depicted as having parallel side portions A and B facing adjacent beams and adapted to receive therethrough the crossbar 120, as well as parallel front and rear portions C and D. As shown, each of the side portions has formed therein an aperture 137 for receiving wiring associated with a chandelier or other electromechanical object to be suspended from the ceiling.

A first flange FA is formed inside portion A and a second flange FB is formed inside portion B by cutting portions of sheet metal representing the parallel front and rear portions of the junction box 130 and bending or folding the resulting tabs toward each other to provide thereby the first flange FA and second flange FB.

The first flange FA has formed therein an aperture 131A, while the second flange FB has formed therein an aperture 131B, each of these apertures 131 adapted to receive therethrough the crossbar 120 to secure thereby the junction box 130 to the crossbar 120.

Each of apertures 131 is formed by partially punching a respective portion of first flange FA or second flange FB and folding the partially punched portion about a bend line. For example, depicted aperture 131B is formed by punching through a piece of sheet metal three sides (left, right and bottom) of a substantially square shape in flange FB, wherein the punched portion is folded about a bend line BB proximate the fourth (un-punched top) side of the substantially square shape to form thereby a flange 132B adapted to mechanically communicate with a top portion of the crossbar 120 when inserted through the junction box 130. Further, a hole 133B is formed within the flange 132B to receive therethrough a screw or bolt adapted to secure the junction box 130 to the crossbar 120, such as to prevent thereby lateral movement of the junction box 130 on the crossbar 120.

In various embodiments, the junction box 130 is sized as a standard electrical junction box such as presenting a downward facing mounting profile or surface of, illustratively, 4"×4" or 4.5"×4.5" or some other shape/size mounting profile. In various embodiments, the junction box 130 is sized as a substantially standard electrical junction box with flanges protruding therefrom by an amount sufficient to accept crossbar 120 while retaining sufficient material to provide strength sufficient to hold an anticipated load such as a chandelier. As depicted in FIG. 1, the junction box 130 comprises a 4.5 square inch box having a height of approximately 7 inches including the first and second flanges FA, FB. Other sizes and shapes may also be used within the context of the various embodiments The bracket housing 140 comprises a single piece of sheet metal which has been cut, punched, folded, bent, drilled or otherwise processed to form the exemplary bracket housing 140 described herein. In various embodiments, other shapes, sizes and so on may be used depending upon the size/shape of the crossbar 120, the size/shape of the beam or other supporting structural member, the size/weight of the object to be suspended and so on.

The depicted bracket housing 140 comprises spaced parallel portions 140A and 140B facing adjacent beams and adapted to receive therethrough the crossbar 120. A bottom portion 140X defines a spacing between the spaced parallel portions 140A and 140B. The bracket housing 140 further includes a first top portion 140T1 and a second top portion 140T2, which top portions 140 are adapted to mechanically communicate with each other and the top of a beam or other structural mounting component.

It is noted that the spaced parallel portions 140A and 140B have formed therein one or more cooperating aperture pairs 141 for receiving therethrough the crossbar 120, illustratively first aperture pair 141A, second aperture pair 141B and third aperture pair 141C. Each of the aperture pairs is formed by partially punching and folding metal such as described above with respect to apertures 131 of the junction box 130. Therefore, each of the apertures has associated with it a respective tab or flange formed during the partial punching process. This tab may be formed in a manner adapted to mechanically and/or supportively communicate with either a top portion, bottom portion or side portion of the crossbar 120.

Advantageously, given that ceiling beams or other structural mounting elements in a house or building may not be at the same height, the use of multiple cooperating aperture pairs 141 enables the use of identical mounting brackets on each of two beams to mount a crossbar therebetween even if the beams are not at equal height. For example, given beams having different heights, a first end of the crossbar 120 may be received via a middle aperture pair 141 of a first bracket housing 140 secured to a first beam, while a second end of the crossbar 120 may be received via an upper or lower aperture pair 141 of a second bracket housing 140 secured to a second beam. In this manner, height differences between the various beams may be compensated at the job site when installing a chandelier or other heavy object.

It is noted that the spaced parallel portions 140A and 140B have formed therein one or more cooperating aperture pairs 142 for receiving therethrough screws, bolts or other fastening devices for securing the bracket housing 140 to a beam 115 or other structural supporting member.

It is noted that the first top portion 140T1 and second top portion 140T2 may have formed therein one or more cooperating aperture pairs 143 for receiving therethrough screws, bolts or other fastening devices for securing the bracket housing 140 to a beam 115 or other structural supporting member.

It is noted that the first top portion 140T1 may have formed therein at least one aperture 144 for receiving therethrough a screw, bolt or other fastening device 145. Similarly, the crossbar 120 may have formed therein at least one aperture 124 for receiving therethrough the screw, bolt or other fastening device 145. In this manner, the fastening device 145 operates to secure the crossbar 120 to the bracket housing 140.

In various embodiments, the fastening device 145 comprises a threaded fastening device such as a screw or bolt which operatively engages with a corresponding threaded height adjustment mechanism associated with the crossbar 120. The threaded height adjustment mechanism may comprise a threaded aperture 124 formed at a top portion of the crossbar 120, a threaded aperture pair 124/124' formed at top and bottom portions of the crossbar 120, or a threaded member disposed between the top and bottom portions of the crossbar 120 (e.g., within the crossbar 120). The threaded member may comprise one or more nuts larger than the aperture 124 or aperture pair 124/124' and compatible with the fastening device thread pattern such that when the fastening device rotatably engages the threaded member an upward or downward force is exerted by the threaded member upon the crossbar 120.

Figure 2:
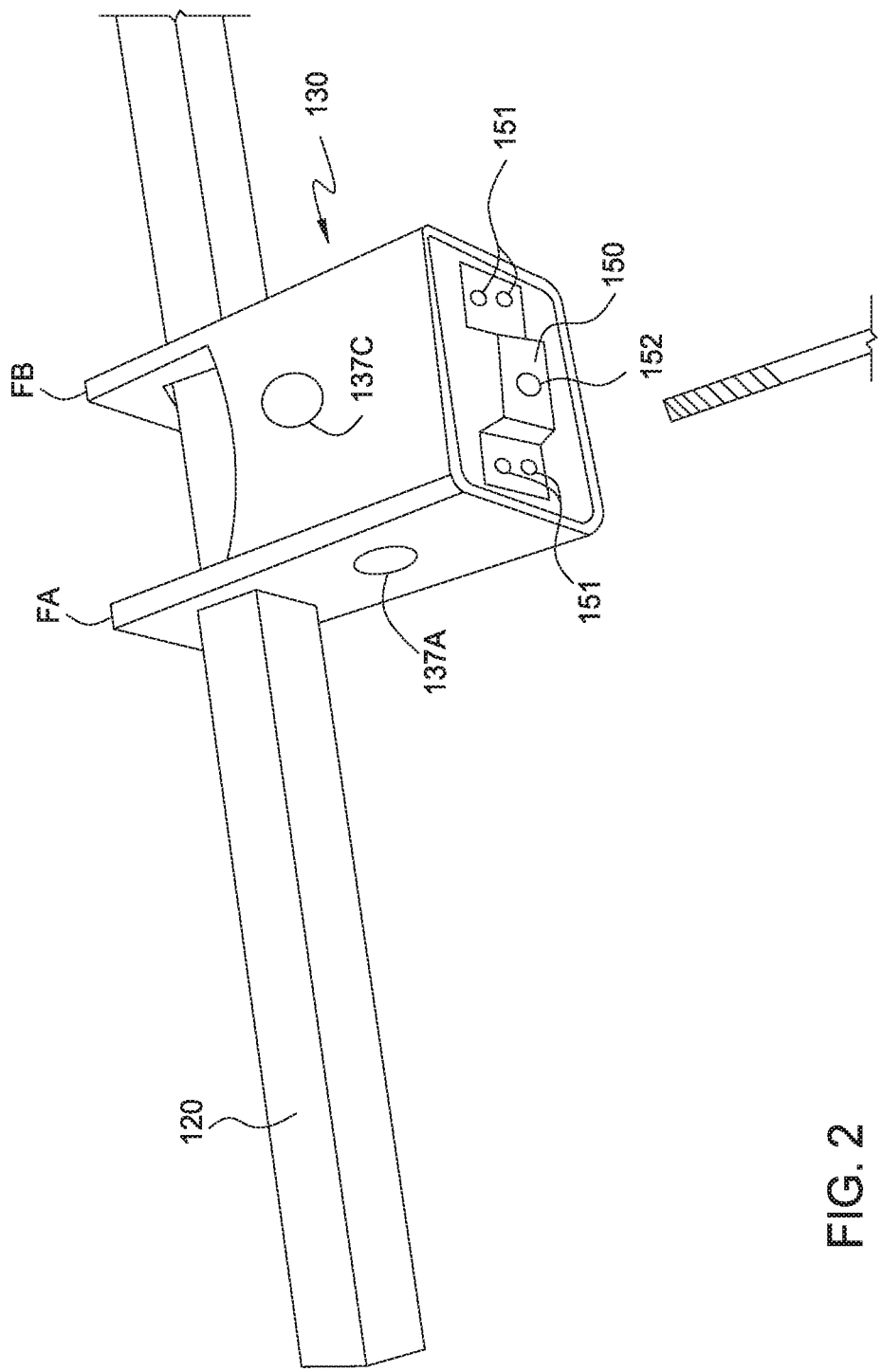
FIG. 2 depicts junction box according to one embodiment.

FIG. 2 depicts a junction box according to one embodiment. Specifically, FIG. 2 depicts a perspective view of a junction box 130 hanging from a crossbar 120 wherein a bottom portion of the junction box 130 is visible and attached to a chandelier mounting racket 150. The chandelier mounting bracket 150 is a standard mounting bracket including a plurality of apertures 151 adapted to receive fastening devices for mounting the chandelier mounting bracket 150 to the junction box 130, and at least one aperture 152 for mounting a chandelier or other object to the chandelier mounting bracket 150.

Figure 3:
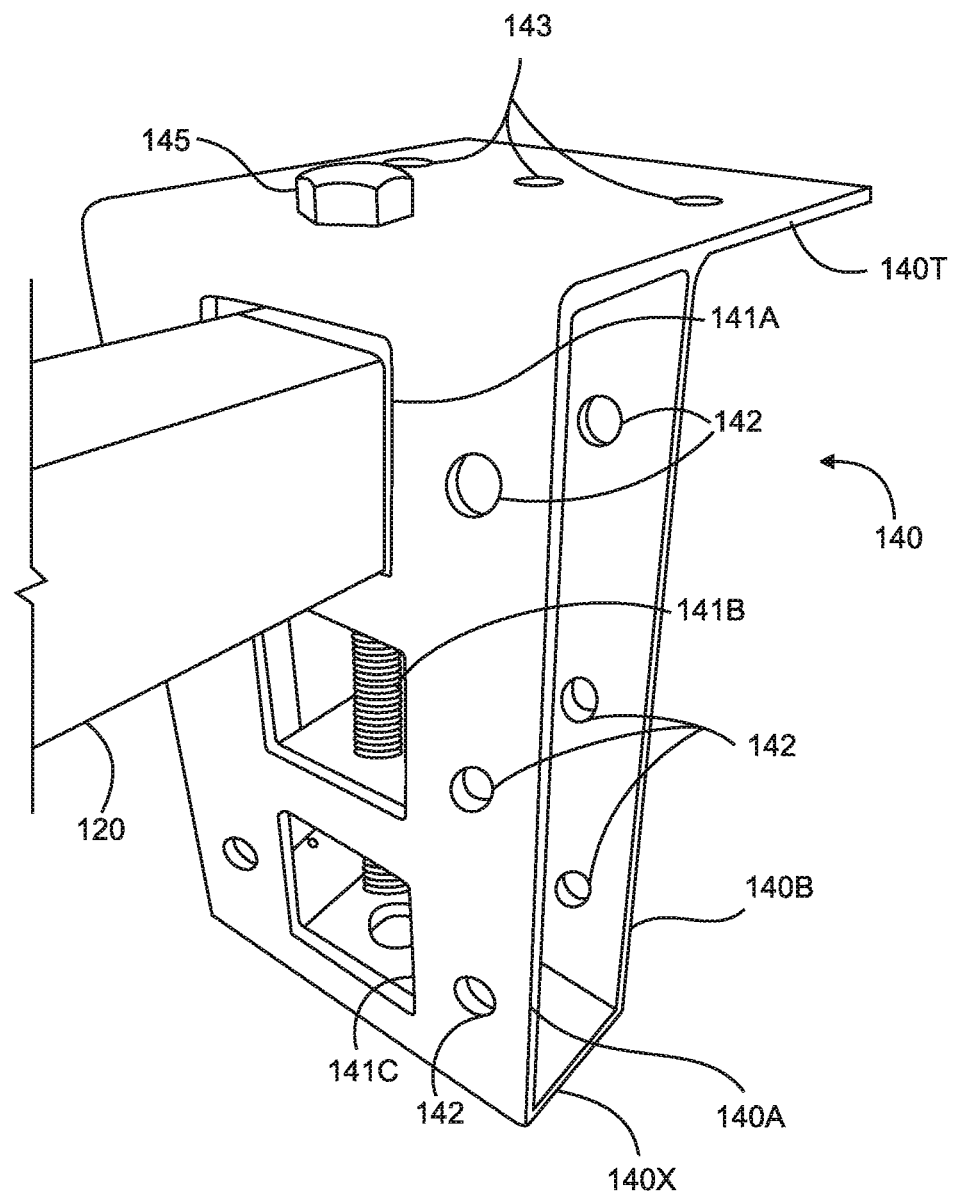
FIG. 3 depicts a bracket housing according to one embodiment.

FIG. 3 depicts a bracket housing according to one embodiment. Specifically, FIG. 3 depicts a perspective view of a mounting bracket 140 such as described above with respect to FIG. 1. The mounting bracket 140 of FIG. 3 differs from the mounting bracket 140 of FIG. 1 in that a single top portion 140T is used rather than first 140T1 and second 140T2 top portions. Further, rather than using partial punching of apertures to produce flanges to assist in mounting, the mounting bracket 140 of FIG. 3 may be formed as a welded piece of material in which full punching of apertures is provided. It can be seen in FIG. 3 that crossbar 120 is inserted into the top aperture pair 141A/141A' of the mounting bracket 140. Further, a threaded fastening device 145, illustratively a threaded bolt, passes through the top portion 140T of the mounting bracket 140 and through the crossbar 120, extending as far as, illustratively, the third aperture pair 1410/1410'. In this embodiment, rotating the threaded fastening device 145 causes the end of the crossbar 120 to be raised or lowered within the top aperture pair 141A/141A' of the mounting bracket 140.

Figure 4:
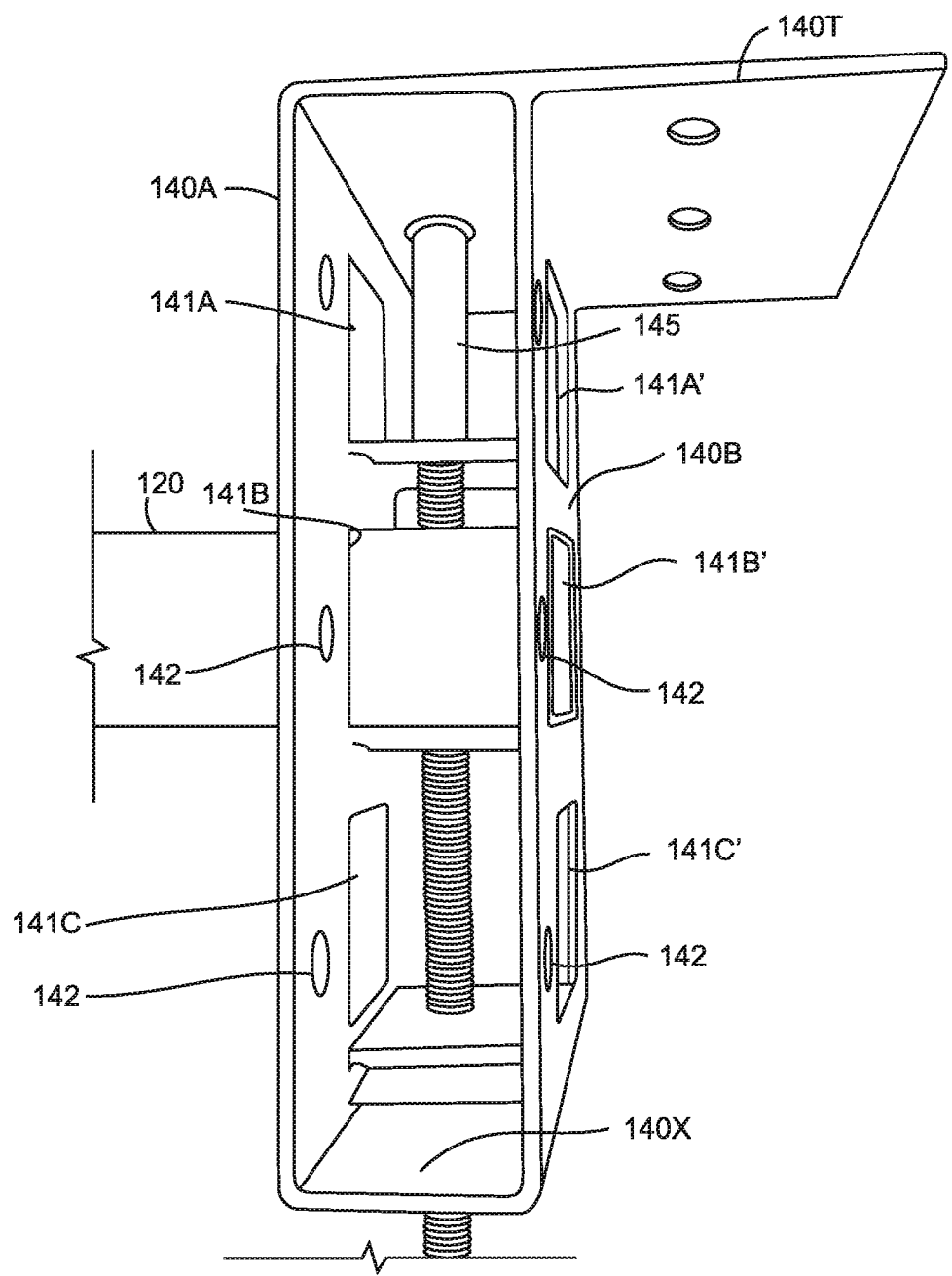
FIG. 4 depicts a side view of the bracket housing of FIG. 3.

FIG. 4 depicts a side view of the bracket housing of FIG. 3. However, unlike FIG. 3, it can be seen in FIG. 4 that the crossbar 120 is inserted into the middle aperture pair 141B/141B' of the mounting bracket 140. In this embodiment, rotating the threaded fastening device 145 causes the end of the crossbar 120 to be raised or lowered within the middle aperture pair 141B/141B' of the mounting bracket 140.

Figure 5:
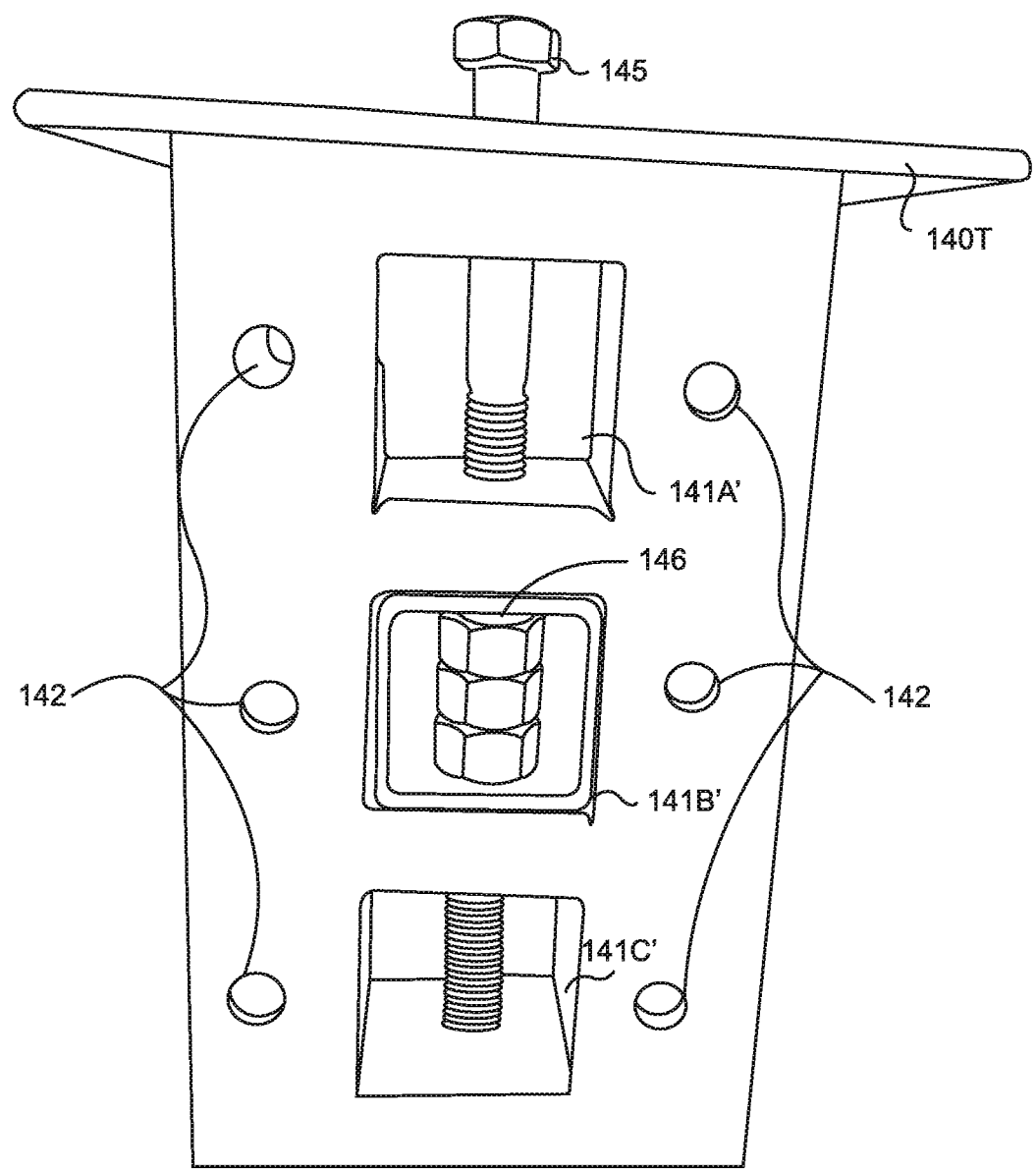
FIG. 5 depicts a side view of the bracket housing of FIG. 4.

FIG. 5 depicts a side view of the bracket housing of FIG. 4. It can be seen in FIG. 4 that a threaded member 146 formed using three nuts is disposed within the crossbar 120, which threaded member/nuts 146 cooperate with the threaded fastening device 145 as previously described to raise or lower the crossbar 120.

Figure 6:
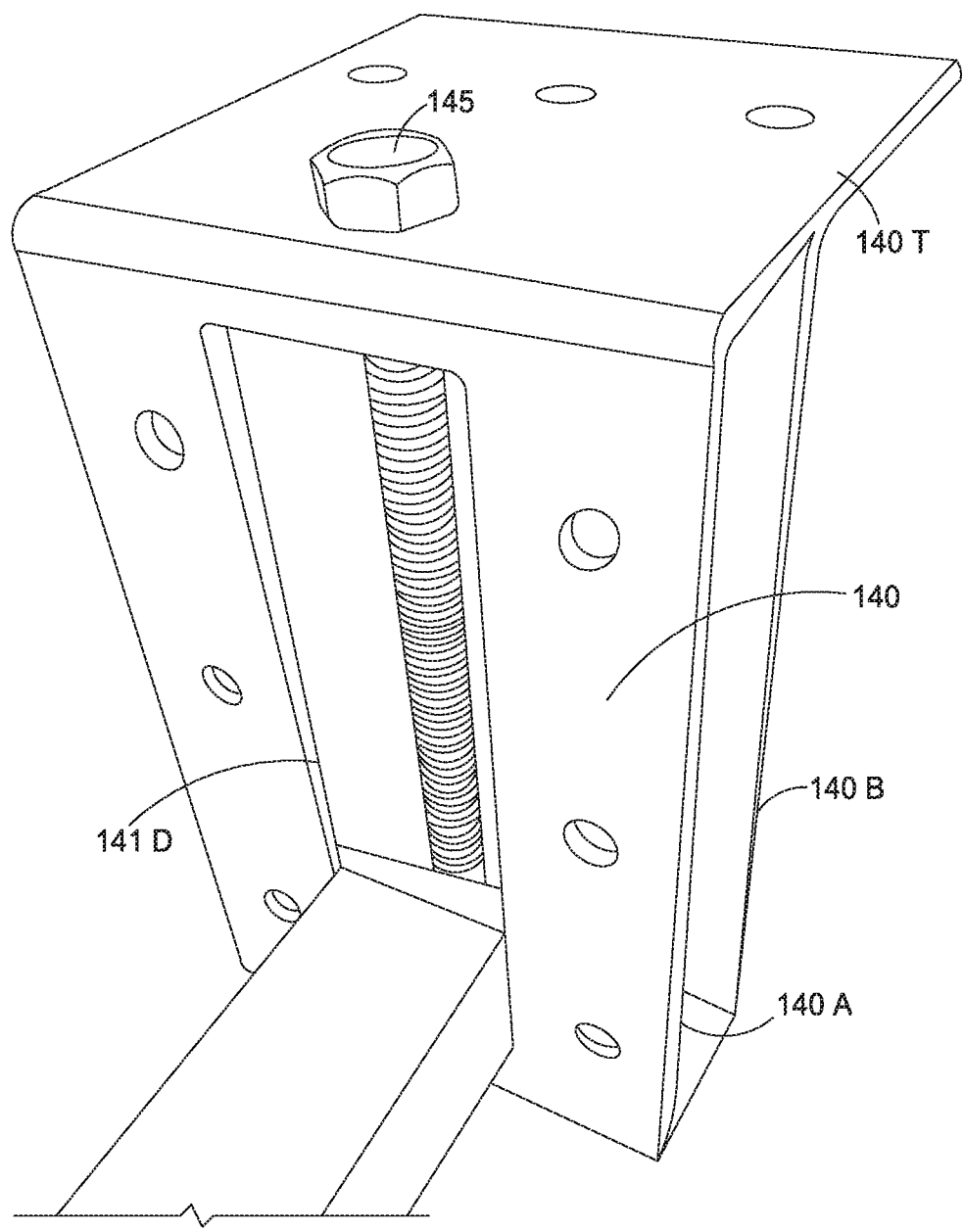
FIG. 6 depicts a bracket housing according to one embodiment.

FIG. 6 depicts a bracket housing according to one embodiment. Specifically, the bracket housing 140 of FIG. 6 comprises a single aperture pair or slot 141D/141D' substantially corresponding to the area previously described with respect to the three aperture pairs in the prior figures. The single aperture pair or slot is adapted to receive therein the end of crossbar 120, which and includes therein a threaded member 146 configured to cooperate with threaded fastening device 145 as previously described. In this embodiment, the cooperation of the threaded member 146 and threaded fastening device 145 enables a vertical range of motion of the end of crossbar 120 encompassing the entirety of the vertical range of the single aperture pair or slot 141D/141D' as shown.

Figure 7:
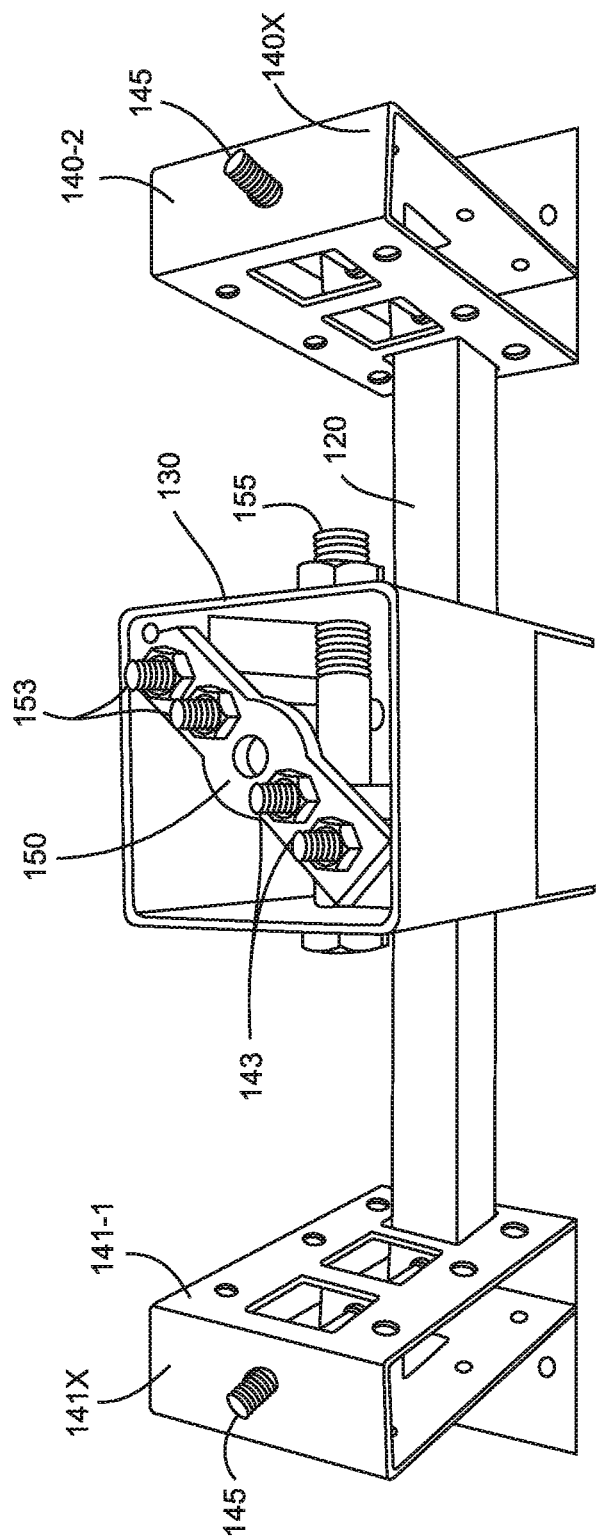
FIG. 7 depicts a system according to one embodiment.

FIG. 7 depicts a system according to one embodiment. In particular, FIG. 7 depicts a bottom-up view looking toward a system in which two mounting brackets denoted as 140-1 and 140-2 are attached to respective beams or structural elements (not shown) within a ceiling (also not shown). The crossbar 120 extends between the two mounting brackets for securing a junction box 130 including a chandelier mounting bracket 150. The chandelier mounting bracket 150 is depicted as being secured to the top of the junction box 130 via two or more fasteners 153 (illustratively four fasteners 153).

A safety bolt 155 is depicted as traversing the junction box 130 above the chandelier mounting bracket 150. The safety bolt 155 is adapted to support the weight of a heavy object such as a chandelier in the event of the mounting bracket 150 failing to support such weight.

Figure 8:
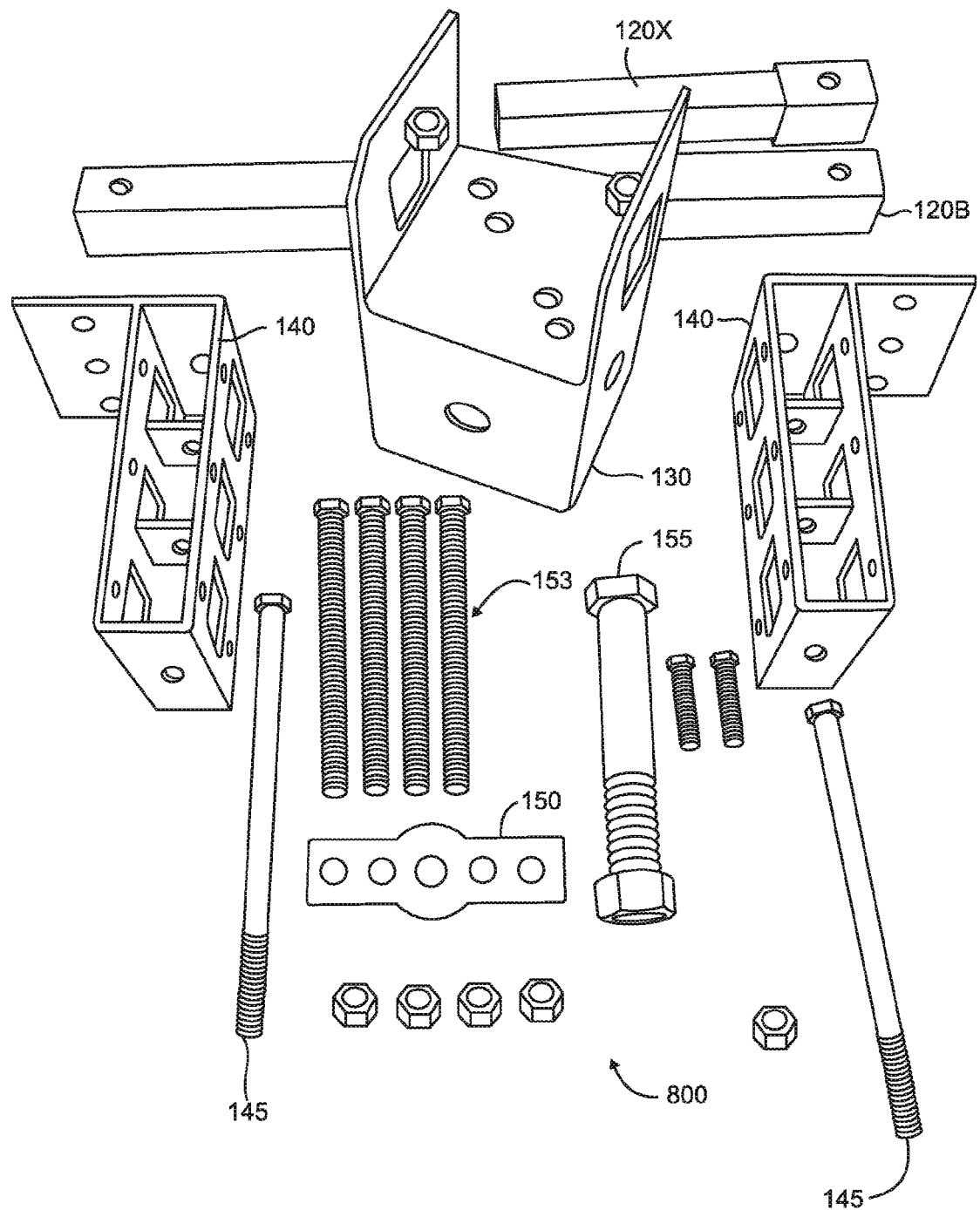
FIG. 8 depicts a kit for a system such as described with respect to FIG. 7.

FIG. 8 depicts a kit for a system such as described with respect to FIG. 7. In particular, the kit 800 of FIG. 8 comprises a pair of mounting brackets 140, a junction box 130, a crossbar 120, a chandelier mounting bracket 150 and various other components such as described herein with respect to the various embodiments. It will be appreciated that the kit 800 may include different components than described herein. For example, the kit 800 may include only a single mounting bracket 140 rather than two mounting brackets 140.

Referring to FIG. 8, it is noted that the crossbar 120 comprises a two piece crossbar 120 comprising a crossbar base 120B and a crossbar extender 120X which slideably engages with the crossbar base 120B to provide thereby a crossbar 120 of selectable length. Various embodiments described herein contemplate the use of any of fixed length and variable length crossbars 120.

The various embodiments described herein provide a system wherein junction boxes and mounting brackets used therein are readily constructed using standard sheet metal processing techniques.

The various embodiments described herein generally contemplate use of a rectilinear crossbar 120. However, the cylindrical crossbar, triangular crossbar or crossbar of some other shape may also be used within the context of various embodiments where apertures and the like may be adapted to accommodate such other shapes.

Various embodiments contemplate the use of a fixed sized crossbar which is cut at the job site in response to the distance between beams or other structural mounting elements. Various embodiments contemplate the use of a telescopic crossbar in which two cylindrical, rectilinear or other shaped crossbar members may be slideably engaged and locked in place to accommodate a particular distance between adjacent beams or other structural elements.

Various embodiments contemplate the use of multiple crossbars and mounting brackets to provide additional mechanical strength where extremely heavy objects are to be mounted.

Various embodiments contemplate the use of a safety cable for attaching a chandelier or other heavy object to be mounted to the junction box 130 and/or crossbar 120 to improve worker safety during installation of the heavy object.

Various embodiments contemplate securing the mounting bracket 142 and IP or other industrial structural element. In these embodiments, mechanically cooperating top portions of the mounting bracket are sized with apertures adapted to receive therethrough mounting bolt suitable for use in, illustratively, I-beam installations and the like.

The various figures depict multiple different embodiments including different use cases, different types of adjustment mechanisms, different types of mounting mechanism sent so on.

In various embodiments, additional leveling mechanisms are provided. As noted herein, different versions of the mounting bracket include a plurality of apertures such that one or more of the provider apertures is appropriate for receiving the crossbar depending upon the construction of the ceiling or regions above the ceiling. As noted above, given that ceiling beams or other structural mounting elements in a house or building may not be at the same height, the use of multiple cooperating aperture pairs 141 enables the use of identical mounting brackets on each of two beams to mount a crossbar therebetween even if the beams are not at equal height. For example, given beams having different heights, a first end of the crossbar 120 may be received via a middle aperture pair 141 of a first bracket housing 140 secured to a first beam, while a second end of the crossbar 120 may be received via an upper or lower aperture pair 141 of a second bracket housing 140 secured to a second beam. In this manner, height differences between the various beams may be compensated at the job site when installing a chandelier or other heavy object.

Various embodiments contemplate modifications made to mounting bracket apertures depending upon application, construction techniques, construction materials, local/national standards and the like. That is, depending upon the country or locality to which such mounting brackets are to be provided, the number of apertures, aperture size, aperture shape, aperture spacing and so on may be adapted. Further, while generally depicted herein as including three apertures, it will be appreciated that more or fewer apertures may be provided within the context of a mounting bracket.

The size and or shape of the apertures may be adapted in accordance with, illustratively, expected crossbar or crossbar extension parameters (round, square, rectilinear and so on).

The spacing between apertures may be adapted in accordance with construction material sizing. For example, the space between apertures may be adjusted to readily spacing between different sizes of construction material. Table 1 (below) depicts typical sizing for lumber in the United States. It is noted that a nominal 2 inch thickness is more likely to be a 1.5 inch (or even 1.75 inch) thickness. Therefore, and more precision installations aperture spacing may be adapted to accommodate different lumber thicknesses, different beam heights and so on. Generally speaking, the use of 2 to 4 apertures with spacing sufficient to allow structural integrity of the outer bracket will be sufficient for most applications.

TABLE 1

| Thickness (inches) | | Width (inches) | |
| --- | --- | --- | --- |
| Nominal | Actual | Nominal | Actual |
| 1 | ¾ | 2 | 1½ |
| 1¼ | 1 | 3 | 2½ |
| 1½ | 1¼ | 4 | 3½ |
| 2 | 1½ | 5 | 4½ |
| 2½ | 2 | 6 | 5½ |
| 3 | 2½ | 7 | 6½ |
| 3½ | 3 | 8 | 7¼ |
| 4 | 3½ | 9 | 8¼ |
| 4½ | 4 | 10 | 9¼ |
| 5+ | ½" less | 11-16 | ¾" less |

Various embodiments as described above allow for precision raising or lowering of the end of the crossbar or crossbar extension within the mounting bracket. For example, various embodiments contemplate the use of a height adjustment element within a mounting bracket such as an adjustment screw, a scissor jack mechanism or similar height adjustment mechanism to enable vertical adjustment of the crossbar or crossbar extension and within the mounting bracket.

Referring to FIG. 6, a mounting bracket comprising a single aperture for receiving a cross bar or extension thereof is shown. Further shown is a threaded bolt which cooperates with the received crossbar end and the mounting bracket to enable the received crossbar and to be raised or lowered by turning the threaded bolt head clockwise or counterclockwise.

Referring to FIGS. 3-5, a mounting bracket comprising three apertures for receiving a crossbar 120 or extension thereof is shown. As with the embodiment of FIG. 6, a threaded bolt is provided which may raise or lower the crossbar end and within the receiving aperture. Of note is the plurality of nuts threaded onto the threaded bolt of FIG. 5. By passing the threaded bolt through the end of the crossbar or crossbar extension as well as through one or more nuts below a weight-bearing portion of the crossbar or crossbar extension, turning the threaded bolt head will cause a threaded bolt to engage with the nuts to raise or lower these nuts and, thereby, raise or lower the crossbar or crossbar extension end.

Various figures introduce different use cases associated with the mounting bracket and system in general. For example, the mounting bracket may be used in different vertical and/or horizontal orientations. The mounting brackets may be used with different sized lumber or the construction materials. In some installations only one mounting bracket is necessary, such as where one end of a crossbar or crossbar extension may be reasonably secured in the installation without using a mounting bracket.

Various embodiments contemplate junction box providing multiple mechanisms of fastening a heavy object, such as a pass-through bolt, a mounting plate and/or other object fastening mechanism.

Generally speaking, the heavy object mounting system described herein comprises several components used together, such as one or more mounting brackets, a crossbar (with or without crossbar extensions), and a junction box. Some of the flexibility of the heavy object mounting system is based upon the highly flexible nature of the mounting bracket which may be operated in a normal mode, and upside down mode, a sideways mode and so on.

Various embodiments may be constructed using different techniques. For example, different portions of the junction box, mounting bracket and so on may be constructed using a partial punch technique wherein a portion of an aperture is punched or cut such that the metal or other material associated with the aperture may be folded or bent to form a flange thereby that may be used to perform additional functions, such as adding structural rigidity, providing an aperture or access point through which a fastener may be passed and the like. Similarly, different portions of the junction box, mounting bracket so on may be constructing using a full punch technique wherein the entirety of an aperture is cut such as via laser or pressurize liquids or some other technique. Further, some embodiments use welding techniques to help form the various components into rigid members, whereas some embodiments do not such that the embodiments may comprise a slightly adjustable sheet metal formed shape that will have significant strength/rigidity after fastening (e.g., a mounting bracket fastened to a beam or joist).

The specific size and shape of certain components as shown and described herein provide numerous manages within the context of the applications discussed herein. In particular, the size, shape, dimensions and other parameters associated with the mounting brackets as described herein enable a heavy object mounting system of enormous versatility.

Figure 9:
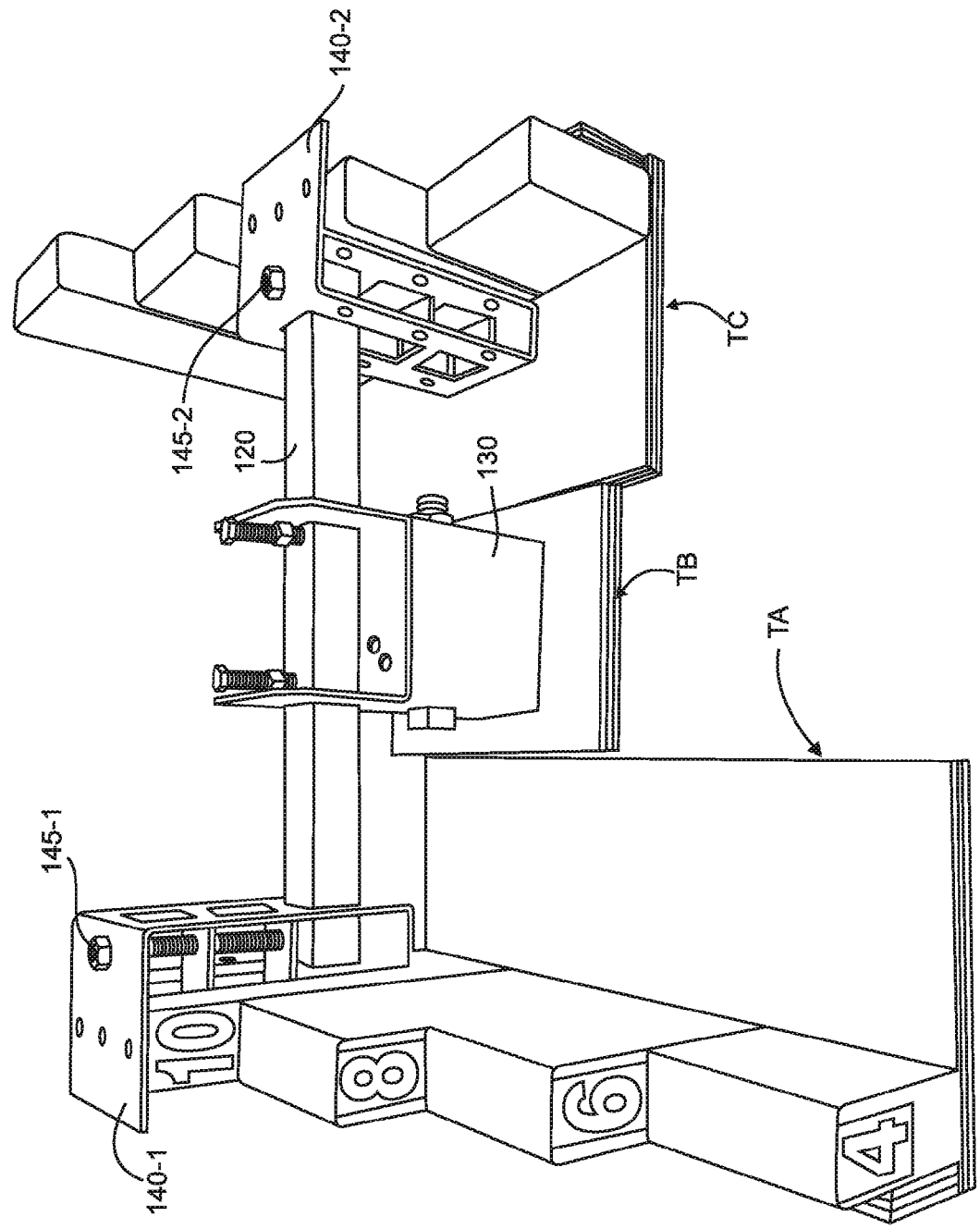
FIG. 9 depicts an exemplary installation of a system in accordance with one embodiment.

FIG. 9 graphically depicts an exemplary installation in accordance with one embodiment. In particular, FIG. 9 depicts a system test structure comprising three testing components slidably engaged with each other. Components TA and TC represent ceiling beams of varying sizes; namely, 2×4, 2×6, 2×8 and 2×10. Component TB represents a sealing portion providing access to a junction box 130 suspended via the crossbar 120, the crossbar 120 supported by a first mounting bracket 140-1 and a second mounting bracket 140-2.

It can be seen by inspection that the mounting brackets 140 each include three apertures as discussed above. It is noted that the first mounting bracket 140-1 is shown is mounted to a 2×10 beam while the second mounting bracket 140-2 is shown as mounted to a 2×6 beam. The inclination of the cross beam 120 and, therefore, junction box 130 is maintained at approximately 0° (i.e., level). Thus, in spite of mounting two different types of beams, a level crossbar is achieved by inserting one end of the crossbar 120 into the bottom aperture of the first mounting bracket 140-1, while inserting the other end of the crossbar ½₂ mounting bracket 140-2. In this embodiment, the aperture vertical spacing of the mounting brackets 140 is selected to at least roughly compensate for 2 inch differences in beam height.

It is noted that the end of the crossbar 120 inserted into the top aperture of the second mounting bracket 140-2 is held in a fixed position by a fastener 145-1. However, the end of the crossbar 120 inserted into the bottom aperture of the first mounting bracket 140—to is held in a variable position by a corresponding fastener 145-1. In this manner, fine adjustments of the inclination of the crossbar 120 may be made by rotating or counter-rotating the fastener 145-1 as appropriate to raise or lower the respective end of the crossbar 120 such that the crossbar 120 or, more particularly, junction box 130 is maintained in level position.

While the foregoing is directed to various embodiments of the present invention, other and further embodiments of the invention may be devised without departing from the basic scope thereof. As such, the appropriate scope of the invention is to be determined according to the claims.

What is claimed is:

1. An apparatus adapted for hanging a load from structural members within a ceiling, the apparatus comprising:
    a junction box configured for securing thereto a load;
    a crossbar configured to cooperate with said junction box to support thereby said junction box; and
    a first bracket housing configured to cooperate with said crossbar and a first structural member within said ceiling, said first bracket housing comprising at least one aperture for receiving an end of said crossbar at one of a plurality of vertical positions.

2. The apparatus of claim 1, wherein said at least one aperture of said first bracket housing comprises a plurality of vertically disposed apertures, each providing a respective vertical position for receiving said end of said crossbar.

3. The apparatus of claim 2, wherein a first bracket housing aperture selected for receiving said end of said crossbar comprises an aperture disposed to support said crossbar at a substantially level inclination.

4. The apparatus of claim 2, wherein a lower edge of each of said vertically disposed apertures is separated from a lower edge of an adjacent vertically disposed aperture by approximately 1.5 inches.

5. The apparatus of claim 1, wherein said first bracket housing has formed thereon a threaded fastening device configured to operatively engage a threaded height adjustment mechanism associated with the crossbar.

6. The apparatus of claim 5, wherein said threaded fastening device and said threaded height adjustment mechanism are configured to enable raising or lowering of a crossbar inserted into a vertically disposed aperture of said first bracket housing.

7. The apparatus of claim 6, wherein said threaded height adjustment mechanism comprises one or more nuts disposed within said crossbar.

8. The apparatus of claim 5, wherein said first bracket housing comprises a single aperture for receiving said end of said crossbar, said single aperture providing access to each of said plurality of vertical positions.

9. The apparatus of claim 1, further comprising:
    a second bracket housing configured to cooperate with said crossbar and a second structural member within said ceiling, said second bracket housing comprising at least one aperture for receiving an end of said crossbar at one of a plurality of vertical positions.

10. The apparatus of claim 9, wherein said first and second bracket housings are substantially identical.

11. The apparatus of claim 9, wherein said first and second structural members within said ceiling comprise beams within said ceiling, said first bracket housing aperture receiving a first end of said crossbar and said second bracket housing aperture receiving a second end of said crossbar, said first and second bracket housing apertures being selected as those apertures which support said crossbar at a substantially level inclination.

12. The apparatus of claim 11, wherein each of said first and second bracket housings are formed by punching and bending a single piece of sheet metal.

13. The apparatus of claim 1, wherein each of said first bracket and said crossbar have formed thereon respective cooperating apertures adapted to receive a fastening device for securing said crossbar within an aperture of said mounting bracket.

14. A kit for hanging a load from structural members within a ceiling, the kit comprising:
    a junction box configured for securing thereto a load;
    a crossbar configured to cooperate with said junction box to support thereby said junction box; and
    a first bracket housing configured to cooperate with said crossbar and a first structural member within said ceiling, said first bracket housing comprising at least one aperture for receiving an end of said crossbar at one of a plurality of vertical positions.

15. The kit of claim 14, further comprising a second bracket housing configured to cooperate with said crossbar and a second structural member within said ceiling, said second bracket housing comprising at least one aperture for receiving an end of said crossbar at one of a plurality of vertical positions.

16. The kit of claim 14, wherein said at least one aperture of said first bracket housing comprises a plurality of vertically disposed apertures, each providing a respective vertical position for receiving said end of said crossbar.

17. The kit of claim 16, wherein a lower edge of each of said vertically disposed apertures is separated from a lower edge of an adjacent vertically disposed aperture by approximately 1.5 inches.

18. The kit of claim 14, wherein said first bracket housing has formed thereon a threaded fastening device configured to operatively engage a threaded height adjustment mechanism to enable raising or lowering of a crossbar inserted into one of said at least one apertures of said first bracket housing.

19. The kit of claim 18, wherein said threaded height adjustment mechanism comprises one or more nuts disposed within said crossbar.

* * * * *